United States Patent [19]

Toohey

[11] Patent Number: 5,598,210

[45] Date of Patent: Jan. 28, 1997

[54] ON CHIP DRIVER FOR ELECTRIC SHUTTERING

[75] Inventor: William J. Toohey, Shortsville, N.Y.

[73] Assignee: Eastman Kodak Company, Rochester, N.Y.

[21] Appl. No.: 388,913

[22] Filed: Feb. 15, 1995

[51] Int. Cl.⁶ .................................................. H04N 5/335
[52] U.S. Cl. ........................................ 348/296; 348/207
[58] Field of Search ................................... 348/207, 220, 348/221, 294, 295, 296, 297, 298, 299, 311, 312, 314, 362; 358/482, 483; 257/223, 229; 327/356; H04N 5/335

[56] References Cited

U.S. PATENT DOCUMENTS

| 3,934,161 | 1/1976 | Caywood | 307/311 |
|---|---|---|---|
| 4,717,945 | 1/1988 | Yusa et al. | 257/229 |
| 4,875,100 | 10/1989 | Yonemoto et al. | 358/213 |
| 4,963,983 | 10/1990 | Kohno et al. | 358/213 |
| 4,977,584 | 12/1990 | Kohno et al. | 377/58 |
| 5,181,101 | 1/1993 | Oda | 358/41 |
| 5,270,558 | 12/1993 | Reich et al. | 257/223 |
| 5,303,052 | 4/1994 | Narabu et al. | 348/299 |
| 5,471,246 | 11/1995 | Nishima et al. | 348/296 |

Primary Examiner—Wendy Garber
Assistant Examiner—Tuan V. Ho
Attorney, Agent, or Firm—James D. Leimbach

[57] ABSTRACT

An electronic shutter that employs a voltage multiplier built within the image sensor semiconductor chip to produce a voltage level that is twice that of the supply. A single control pulse is used to actuate the voltage multiplied level which is then applied to a circuit that uses the increased level. The voltage multiplier is a capacitive based circuit that precharges a capacitor to a given supply voltage. Upon application of a shutter control signal, the supply voltage is then applied to the opposite side of the capacitor while retaining the potential difference across the capacitor, thereby, doubling the voltage level on the first side of the capacitor. This doubled voltage is then used for electronic shuddering purposes.

20 Claims, 2 Drawing Sheets

ON CHIP DRIVER FOR ELECTRIC SHUTTERING

BACKGROUND OF THE INVENTION

1. Field of the Invention

The present invention pertains to shuttering of electronic cameras, and more particularly, to the shuttering of image sensing semiconductors contained on electronic cameras.

2. Description of the Prior Art

Electronic shuttering of a CCD sensor is, typically, accomplished by applying a voltage pulse to the substrate of a sensor that has a vertical overflow anti-blooming feature. The voltage required for shuttering can be as much as 40 volts, typically requiring the addition of a large number of discrete components with the resulting assembly time.

Numerous devices within the prior art have addressed electronic shuttering techniques for image sensing devices. Various devices have addressed controlled shutter pulse generation, vertical overflow drains and electronic shutters for charge coupled imagers.

More specifically, U.S. Pat. No 5,181,101 issued to K. Oda (hereafter referred to as Oda) discloses an "Image Sensing Apparatus" which combines two voltages to create a shutter function potential. While Oda may teach an adder employed to combine two potentials into a larger shutter potential, no disclosure is made towards a method or apparatus that is capable of generating a shutter potential on the same semiconductor chip as the CCD.

U.S. Pat. 4,875,100 issued to Yonemoto et al, (hereinafter referred to as Yonemoto) discloses an "Electronic Shutter For A CCD Image Sensor" that teaches an electronic shutter function for video cameras to enable shuttering without the use of mechanical shutters. However Yonemoto does teach a concept of an on chip electronic shutter, and more specifically, does not disclose the use of a voltage multiplier to create a shutter potential.

An "Integrated Electronic Shutter" for charge coupled devices was disclosed in U.S. Pat. No. 5,270,558 issued to Reich et al (hereinafter referred to as Reich) taught a device used for integrating the electronic shutter elements on to an CCD imager. However, disclosure was only made of drain regions for the purposes of shuttering and no disclosure was made of on chip voltage multipliers used as an electronic shutter.

As can be seen by the foregoing discussion, there remains a need within the prior art for a method and apparatus that teaches on chip shuttering techniques in a manner that can be used easily and economically. Such a method and apparatus are disclosed by the voltage multiplier techniques of the present invention. The present invention eliminates all circuits external to the sensor chip and uses only a 5 volt control pulse from the system timing controller.

SUMMARY OF THE INVENTION

An image sensing device uses a voltage multiplier built on the sensor chip to produce a voltage level that is twice that of the supply voltage as an electronic shutter. A single control pulse is used to actuate the voltage multiplied level which is then applied to a circuit that uses the increased level. The voltage multiplier is a capacitive based circuit that precharges a capacitor to a given supply voltage. Upon application of a shutter control signal, the supply voltage is then applied to the opposite side of the capacitor without allowing the potential generated across the capacitor to dissipate, thereby, doubling the voltage level on the first side of the capacitor. This doubled voltage is then used for electronic shuddering purposes.

It is the object to of the present invention to teach an apparatus for electronic shuttering that can be provided on a semiconductor device.

It is further the object of the present invention to disclose a the use of voltage multiplier techniques that can be used on an image sensor for the purpose of electronic shuttering.

It is still further the object of the present invention to teach the use of capacitively stored charges upon an image sensing device to provide the necessary potentials required for electronic shuttering.

DETAILED DESCRIPTION OF THE PREFERRED EMOBIDMENT

Figure 1:
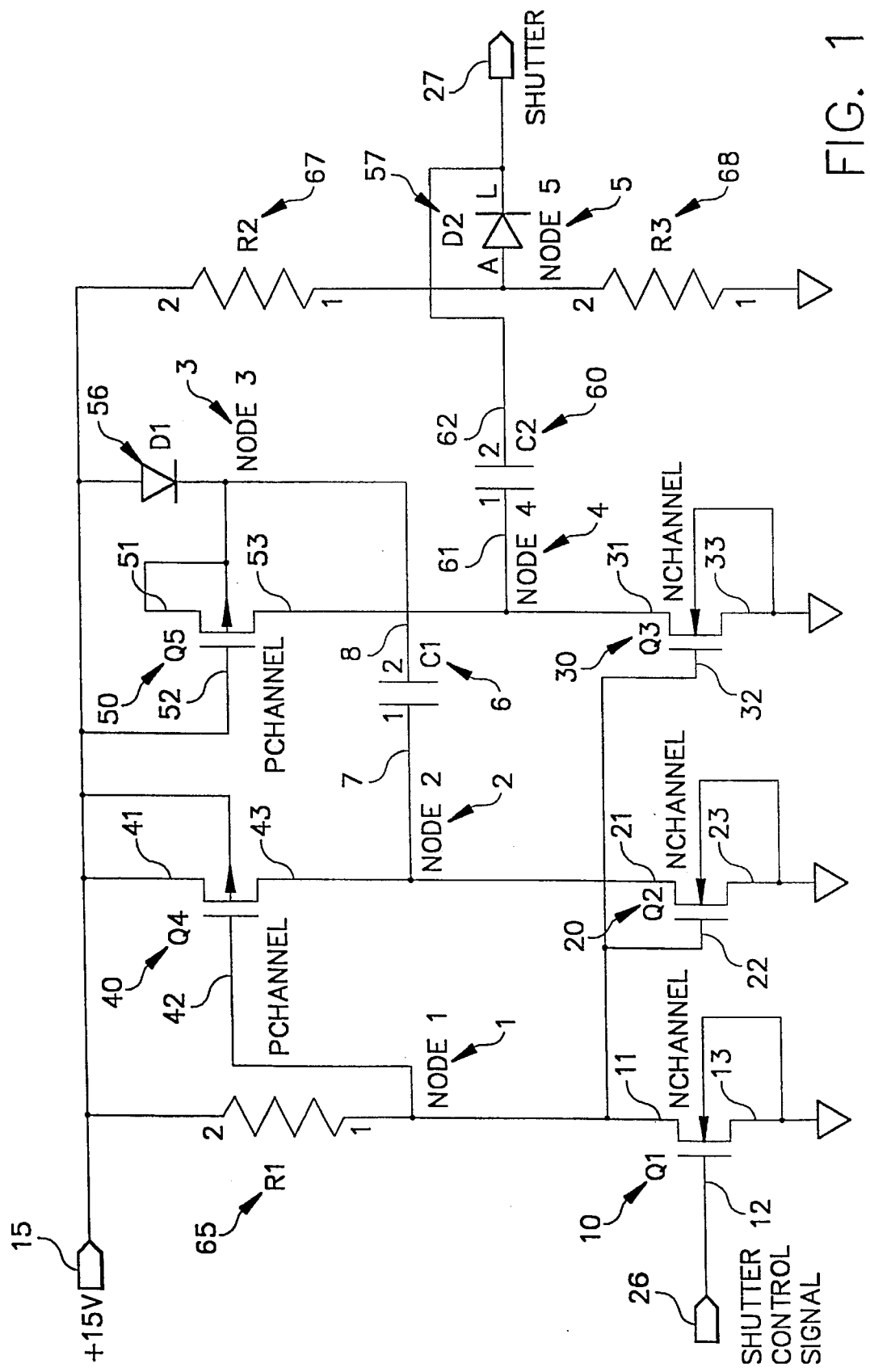
FIG. 1 is a schematic diagram of the first preferred embodiment of the invention.

Referring to FIG. 1, it has been discovered that an electronic shuttering device for an image sensing device can be created with a circuit that is self contained on the image sensing device. The present invention, as shown in FIG. 1, uses a voltage multiplier built on the sensor chip to produce a voltage level that is twice that of the supply. A single shutter control pulse (26) is used to activate the voltage multiplier to create a voltage level that is twice that of the 15 volt supply level, generally referred to as (15), to create a 30 volt pulse. This 30 volt pulse is then applied to the substrate shutter (27) which then uses the increased level for shuttering purposes.

The initial conditions of the circuit of FIG. 1 are maintained such that Q1 (10), which is an N-channel FET, is in an OFF state with gate (12) of Q1 (10) being tied to the shutter control signal (26) and, initially, the shutter control signal (26) is at a 0 volt potential. Having Q1 (10) in an OFF state leaves Node 1 (1) at a 15 volt level due to the connection made between the drain (11) of Q1 and R1 (65). Q2 (20) is another N-channel FET device that is initially at an ON state with its gate (22) tied to the soft 15 volt level of Node 1 (1). In initial conditions Node 2 (2) is pulled down to a potential level of 0 volts due to the presence of the drain (21) of Q2 on Node 2 (2) and with Q2 (20) being in an ON state. Q3 (30) is also an N-channel FET that is initially in an ON state due to the initial 15 volt level of Node 1 (1). When Q2 (20) and Q3 (30) are in 0N states, Node 3 (3) will be at a level of 15 volts. Q5 (50) is a P-channel FET that is initially in an OFF state with the source (51) of Q5 connected to the +15 volt supply through D1 and the 15 volt supply (15) being applied directly to the gate (52) of Q5.

To initiate the shuttering function, the shutter control pulse (26) is applied to the gate (12) of Q1 (10) by raising it to a 5 volt level, which results in Q1 (10) being switched to an ON state, and allowing Node 1 (1) to switch from the soft 15 volt level to 0 volts. Once the shuttering control pulse (26) switches Q1 (10) to an ON state, the 0 volt potential at Node 1 (1) turns off both Q2 (20) and Q3 (30). Q4 (40), which is initially in an OFF state, is turned ON by Node 1 (1) becoming 0 volt s resulting in Node 2 (2) becoming 15 volts.

As an initial condition, capacitor 1 (6) has a voltage of 15 volts across it as determined by the initial conditions of Node 2 (2) and Node 3 (3) as discussed above. This potential results from a 0 volts at Node 2 (2) and 15 volts on Node 3 (3). The application of the shutter control pulse (26) results in Node 2 (2) becoming 15 volts and Node 3 (3) 30 volts, preserving the potential difference across C1 (6). Due to the placement of diode 1 (56), Node 3 can achieve a higher potential than the 15 volt supply. The 30 volts is applied to the source (51) of Q5 (50) through Node 3 (3) resulting in Q5 (50) turning on because the source (51) is at a substantially higher potential than the gate (52). With the source (51) of Q5 at 30 volts, the drain (53) is then pulled to 30 volts because Q3 (30) is now turned OFF by Node 1 (1) being 0 volts, as discussed above.

Capacitor 2 (60) initially has a voltage of 0 volts applied to pin 1 (61) with the voltage between pins 1 (61) and pin 2 (62) determined by the potential that Node 5 (5) is initially set at by R2 (67) and R3 (68). The 30 volt potential described above results in the application of 30 volts to pin 1 (61) of capacitor 2 (60). Thus, the potential that Node 5 (5) has initially set for the output side of D2 (57) would then be elevated by the addition of the 30 volts. This 30 volts would be added to the substrate voltage. Node 5 (5) has a potential voltage that is determined by R2 (67) and R3 (68), and this potential is used to set the substrate voltage for proper anti-blooming purposes. In the preferred embodiment of the invention, for the circuit of FIG. 1 as described above, the substrate voltage should be between 5 and 12 volts. The 30 volt pulse is applied to the substrate as a shutter clocking voltage on the cathode side of D2. By having the substrate biasing circuitry on the anode side of D2, the shutter clocking voltage, as applied to the substrate, will not affect the substrate biasing voltage. In this manner, the substrate can be maintained at a voltage outside the 5–12 volt range and still function properly.

Figure 2:
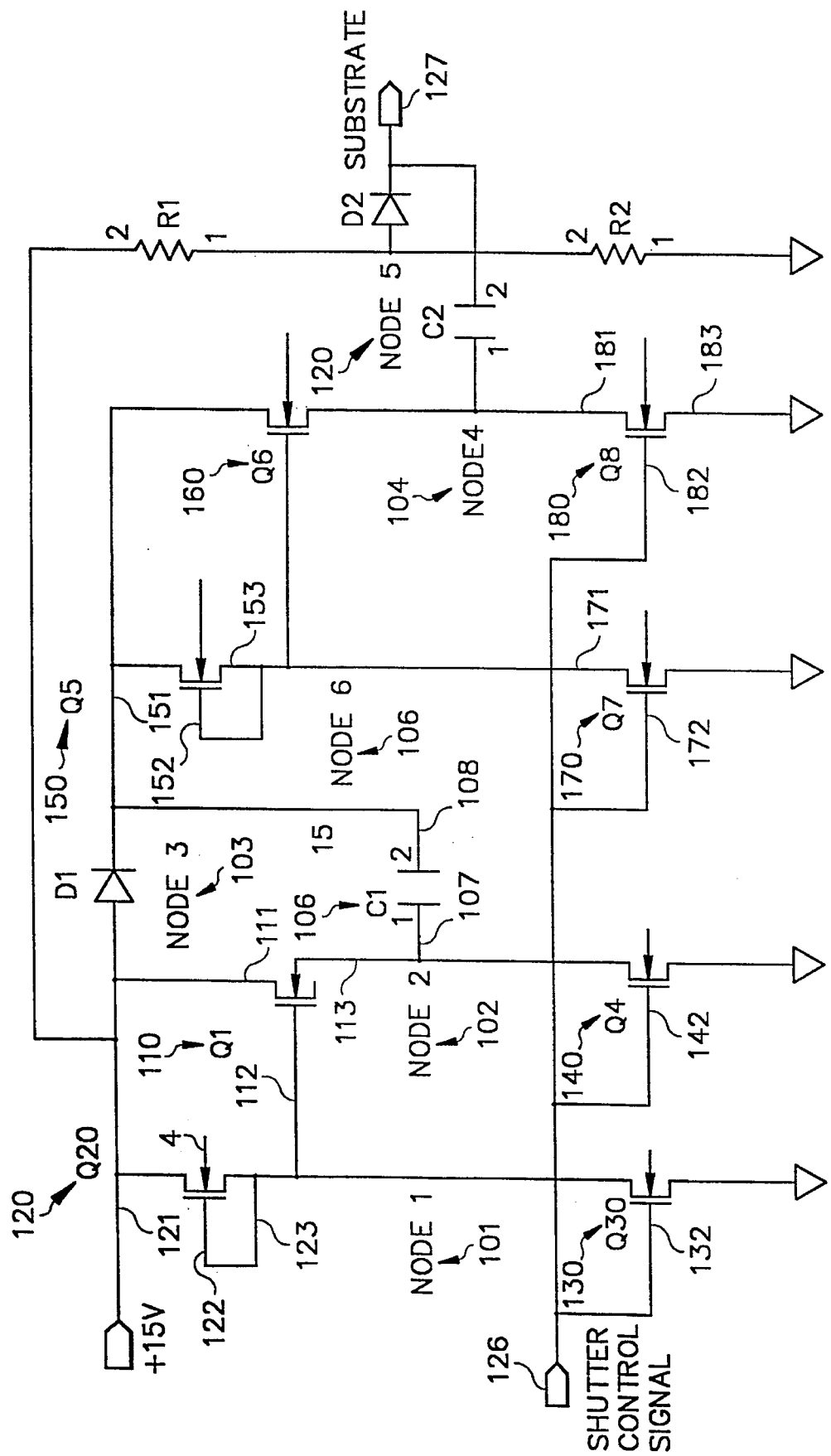
FIG. 2 is a schematic diagram of the second preferred embodiment of the invention.

While the diagram of FIG. 1 offers the best performance by employing a P-channel FET device, this is not the most preferred embodiment of the present invention. The P-channel devices employed in the embodiment of FIG. 1 may offer a higher voltage swing and yield a full 30 volt shuttering potential. However, an embodiment that is more preferred is the embodiment as shown in FIG. 2. The embodiment in FIG. 2 is constructed completely with N-channel devices yielding a performance that very close to the performance of the structure of FIG. 1, though not actually quite as good. However, the embodiment is more preferred because of the fact that it has all N-channel devices, resulting in a design that is easier to fabricate, and more realistic to manufacture than is the device in FIG. 1. The depreciation in performance from the N-channel configuration is not significant enough to prefer the embodiment of FIG. 1 with the more difficult design constraints associated with it. The embodiment shown in FIG. 2 has a potential voltage swing of only 26 to 28 volts. While this may not be as great as the greater voltage swing of 30 volts for the embodiment of FIG. 1, it is certainly sufficient to use for shuttering purposes envisioned by the present invention.

As can be seen by referring to FIG. 2, there is a shutter control signal 126 that is used to control the entire circuit and a shutter substrate signal 127 that is used to apply the increased voltage from the circuit to the substrate of the device. The circuit of FIG. 2 works in a similar fashion of that of the circuit in FIG. 1, although there are some basic differences in operation. Initial condition for the circuit of FIG. 2 have the shutter control signal 126, that is an active low TTL signal, applied to the gates of Q3 (130), Q4 (140), Q7 (170) and Q8 (180) in an inactive state. This results in a TTL high being applied to the gates (132, 142, 172 and 182) of these four transistors resulting in Q3, Q4, Q7 and Q8 (130, 140, 170 and 180) being in an ON state initially, which in turn results in Nodes 1, 2, 4, and 6 being at or near 0 volts. Having Node 2 at 0 volts initially will initially have capacitor C1 (106) with a 15 volt potential across it by having pin 2 (108) on C1 (106) brought up to that 15 volt level by the proximity to the 15 volt supply and the direction of diode D1 (156). Diode D1 (156) is connected to the 15 volt source and oriented such that it will conduct in the direction of pin 2 (108) of C1. Pin 1 (107) of C1 (106) is initially at a 0 volt potential due to Node 2 being kept at 0 volts because Q4 (140) is initially ON.

The application of the shutter pulse signal 126 is a TTL high to low transition to the gates (132, 142, 172 and 182) of Q3, Q4, Q7, and Q8 (130, 140, 170 and 180) causing these transistors to turn OFF. Q3 (130) turning OFF causes Node 1 (101) to be taken from its initial condition of 0 volts to 15 volts. Node 1 (101) is allowed to rise to this 15 volt level due to the configuration of Q2 (120) as constant current source. This results in a 15 volt level being applied to the gate of Q1, which is configured as a source follower. The source (113) of Q1 (110) then follows the voltage level of the gate (112) to also attain a 15 volt level. The circuit configuration allows this to occur because Q4 (140) is also turned OFF by the shutter control signal resulting in Node 2 (102) being allowed to come up to a value of 15 volts. By having 15 volts at Node 2 (102), C1 (106) has its pin 1 (107) also at a level at 15 volts. This creates again a voltage multiplied situation where pin 2 (108) of C1 (106) becomes 30 volts. This 30 volt level is then directly applied through Node 3 (103) to the drain (151) of Q5 (150). Node 1 (101) is also applied to the gates (172, 182) of Q7 and Q8 (170, 180) and the 0 volt potential of Node 1 makes Q7 and Q8 (170, 180) switch to an OFF state. This allows the drains (171, 181) of Q7, Q8 (170, 180) to rise to the level that is applied to their drains.

The drain (171) of Q7 (170) is tied to the source 153 of Q5 (150). Q5 (150) is configured to operate as a constant current source. Since the drain of Q5 (150) is at essentially a 30 volt level which is much higher than the source or the gate (152) of Q5 (150), this causes Q5 (150) to conduct and the source region also quickly becomes 30 volts.

Q6 (160) is configured as a source follower. Thus, having 30 volts at its gate (162) from the source (153) of Q5 (150) and the drain (161) of Q6 (160) from Node 3 (103). With Q8 (180) being turned OFF by shutter control signal (126), the source (163) of Q6 (160) will achieve a 30 volt level following the gate (162) of Q6 (160). This will cause the 30 volt potential to be applied to Node 4 on pin 1 of C2. Through C2 (190) the 30 volt level is applied to the cathode of diode D2 (157). As in the circuit of FIG. 1 the substrate voltage is adjusted through diode 2 (157) according to the levels of R1 (165) and R2 (167) and the level of the substrate voltage as adjusted. Thereby controlling the amount of shuttering voltage that is required to make the electronic shutter work.

The main advantage of the present invention is the ease of use by those persons manufacturing cameras. It is not necessary to provide the circuitry required to operate electronic shutters in the sensor. The only additional circuit required with the present invention is to provide a TTL timing pulse to the sensor. An additional advantage is that the user of the final camera has less opportunity to improperly operate the electronic shutter resulting in poor results or in damage to the sensor.

While the preferred embodiments have been described, various modifications will be obvious to those skilled in the relevant arts. Therefore, it should be understood that the scope and spirit of the invention is to be determined by the appended claims.

Parts List

| | |
|---|---|
| 1 | Node 1 |
| 2 | Node 2 |
| 3 | Node 3 |
| 5 | Node 5 |
| 6 | capacitor 1 (C1) |
| 10 | Q1 (N-channel FET) of FIG. 1 |
| 11 | Q1 drain |
| 12 | Q1 gate |
| 13 | Q1 source |
| 15 | 15 volt supply |
| 20 | Q2 (N-channel FET) of FIG. 1 |
| 21 | Q2 drain |
| 22 | Q2 gate |
| 23 | Q2 source |
| 26 | shutter control pulse signal |
| 27 | substrate shutter |
| 30 | Q3 (N-channel FET) of FIG. 1 |
| 31 | Q3 drain |
| 32 | Q3 gate |
| 33 | Q3 source |
| 40 | Q4 (P-channel FET) of FIG. 1 |
| 41 | Q4 source |
| 42 | Q4 gate |
| 43 | Q4 drain |
| 50 | Q5 (P-channel FET) of FIG. 1 |
| 51 | Q5 source |
| 52 | Q5 gate |
| 53 | Q5 drain |
| 56 | diode 1 (D1) |
| 57 | diode 2 (D2) |
| 60 | capacitor 2 (C2) |
| 61 | pin 1 of C2 |
| 62 | pin 2 of C2 |
| 65 | R1 |
| 67 | R2 |
| 68 | R3 |
| 101 | Node 1 FIG. 2 |
| 102 | Node 3 FIG. 2 |
| 103 | Node 3 FIG. 2 |
| 104 | Node 4 FIG. 2 |
| 105 | Node 5 FIG. 2 |
| 106 | Capacitor 1 (C1) of FIG. 2 |
| 107 | pin 1 of C1 |
| 108 | pin 2 of C1 |
| 110 | Q1 (N-channel FET) of FIG. 2 |
| 111 | Q1 drain |
| 112 | Gate Q1 |
| 113 | Q1 source |
| 120 | Q2 (N-channel FET) of FIG. 2 |
| 121 | Q2 drain |
| 122 | gate Q2 |
| 123 | Q2 source |
| 126 | shutter control signal |
| 127 | shutter substrate signal |
| 130 | Q3 (N-channel FET) of FIG. 2 |
| 131 | Q3 drain |
| 132 | gate Q3 |
| 133 | Q3 source |
| 140 | Q4 (N-channel FET) of FIG. 2 |
| 141 | Q4 drain |
| 142 | gate Q4 |
| 143 | Q4 source |
| 150 | Q5 (N-channel FET) of FIG. 2 |
| 151 | Q5 drain |
| 152 | gate Q5 |
| 153 | Q5 source |
| 160 | Q6 (N-channel FET) of FIG. 2 |
| 161 | Q6 drain |
| 162 | gate Q6 |
| 163 | Q6 source |
| 170 | Q7 (N-channel FET) |
| 171 | Q7 drain |
| 172 | gate Q7 |
| 173 | Q7 source |
| 180 | Q8 |
| 181 | Q8 drain |
| 182 | gate Q8 |
| 183 | Q8 source |
| 190 | C2 |
| 191 | Pin 1 of C2 |
| 192 | pin 2 of C2 |

I claim:

1. An image sensing device having electronic shuttering comprising:

an image sensor chip;

a voltage multiplier containing a charge storage device built into the image sensing device;

a source of applying a first potential to the voltage multiplier;

a second potential generated from the voltage multiplier, the second potential being essentially twice the first potential; and means for applying the second potential generated as an electronic shuttering signal.

2. The device of claim 1 further comprising:

a capacitive storage device as the charge storage device having a first side with the first potential applied, thereto, and a second side of the capacitive storage device having essentially zero potential applied, thereto; and a circuit for applying the first potential to the second side of the capacitive storage device while sufficiently isolating the first side of capacitive storage device to, thereby, generate the second potential on the first side of the storage device that is essentially twice the first potential.

3. The device of claim 2 wherein the circuit for applying the first potential to the second side of the storage device further comprises a transistor circuit that switches state to apply the first potential to the second side of the storage device.

4. The device of claim 3 wherein the circuit further comprises a diode also connected to the first side of the storage device such that it conducts towards the storage device but not away from the storage device.

5. The device of claim 1 wherein the means for applying the second potential generated as an electronic shuttering pulse further comprises a transistor circuit for transmitting the second potential from the first side of the storage device to a substrate of the device.

6. The image sensing device of claim 5 wherein the transistor circuit has an initial state and a shuttering state.

7. The device of claim 6 wherein the shuttering state is activated by an electronic signal causing a transistor network to change states.

8. The device of claim 7 wherein the means for applying the second potential generated as an electronic shuttering signal further comprises means for setting a base potential level for the shuttering signal.

9. The invention of claim 8 wherein the means for setting the potential level further comprises a resistor diode network.

10. A method for electronic shuttering of an image sensing device comprising the steps of:

manufacturing an image sensing device having a substrate with a substrate potential level that can be electronically shuttered by addition of a shuttering potential;

providing to the image sensing device a power source of a first potential that is a fraction of the shuttering potential;

creating a voltage multiplying circuit on the image sensing device;

applying the first potential to the voltage multiplying circuit input such that the output of the voltage multiplier is essentially equal to the shuttering potential; and electronically shuttering the substrate by applying the shuttering potential generated from the voltage multiplier to the substrate.

11. The method of claim 10 wherein the step of creating a voltage multiplying circuit on the device further comprises the steps of:

generating a potential essentially equal to the first potential across a charge storage device such that a first side of a charge storage device has a higher potential than a second side of the charge storage device; and applying the first potential to the second side of the storage device while retaining the potential across the charge storage device that was created in the generating step, thereby creating a doubled potential on the first side of the charge storage device.

12. The method of claim 10 wherein the step of manufacturing further comprises manufacturing a device that has means for adjusting the substrate potential level.

13. The method of claim 12 wherein the step of manufacturing further comprises manufacturing a device that has means for separating the shuttering potential from the means for adjusting the substrate potential level.

14. The method of claim 10 wherein the step of creating a voltage multiplier circuit further comprises creating a voltage multiplier circuit using a transistor diode network.

15. The method of claim 14 wherein the transistors used are exclusively N-channel FET transistors.

16. The method of claim 14 wherein the transistors used are a combination of N and P channel FET transistors.

17. An image sensing device having electronic shuttering comprising:

an image sensor chip having a substrate that can be electronically shuttered with a shuttering potential;

a source of applying a first potential to the device that is essentially half the shuttering potential;

a voltage multiplier containing a capacitive storage device having the first potential generated across the capacitive device with a first side of the capacitive device being positive with respect to a second side of the capacitive device;

a circuit for applying the first potential to the second side of the capacitive storage device while sufficiently isolating the first side of capacitive storage device to, thereby, generate a second potential on the first side of the storage device that is essentially twice the first potential; and means for applying the second potential generated as the shuttering potential to the substrate.

18. The device of claim 17 wherein the circuit for applying the first potential to the second side of the capacitive device further comprises a transistor diode network that switches state to apply the first potential to the second side of the capacitive device upon application of a single control signal.

19. The device of claim 17 wherein the means for applying the second potential generated as an electronic shuttering signal further comprises means for setting a substrate potential level for electronic shuttering.

20. The invention of claim 19 wherein the means for setting the potential level further comprises means for isolating the means for setting the substrate potential level from the voltage multiplier.

* * * * *

UNITED STATES PATENT AND TRADEMARK OFFICE
CERTIFICATE OF CORRECTION

PATENT NO.    : 5,598,210
DATED         : January 28, 1997
INVENTOR(S)   : William J. Toohey It is certified that error appears in the above-indentified patent and that said Letters Patent is hereby corrected as shown below:

In The Title: Delete "ELECTRIC" and insert --ELECTRONIC--

In The Abstract: In the last sentence delete "shuddering" and insert "shuttering".

In Column 2, line 3: Delete "shuddering" and insert --shuttering--.

Signed and Sealed this

Twenty-second Day of July, 1997

Attest:

BRUCE LEHMAN

*Attesting Officer*    *Commissioner of Patents and Trademarks*